(12) United States Patent
Rao et al.

(10) Patent No.: US 6,421,337 B1
(45) Date of Patent: Jul. 16, 2002

(54) CONVERTING DEVICE FOR ALLEVIATING SWITCH CONGESTION CAUSED BY LONG HOLD TIMES FOR ON-LINE ACCESS CALLS

(75) Inventors: Sridhar Rao; Seeta Hariharan, both of Raleigh; Shou-Huey Jiang, Durham; Steven Robert Medeiros, Raleigh, all of NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/990,941

(22) Filed: Dec. 15, 1997

(51) Int. Cl.[7] .............................................. H04Q 11/04
(52) U.S. Cl. ....................... 370/351; 370/401; 370/463; 379/887
(58) Field of Search ................................ 370/351, 352, 370/353, 354, 355, 356, 389, 401, 420, 463, 466, 467, 237, 385; 379/88.17, 10.01, 334, 230, 221.11, 229, 221.09, 88.25; 340/827; 725/106, 119, 4

(56) References Cited

U.S. PATENT DOCUMENTS

| | | | |
|---|---|---|---|
| 5,001,970 A | * | 3/1991 | Takano et al. |
| 5,423,003 A | | 6/1995 | Berteau ....................... 395/200 |
| 5,602,991 A | | 2/1997 | Berteau ................... 395/200.01 |
| 5,610,910 A | * | 3/1997 | Focsaneanu et al. ......... 370/351 |
| 5,712,903 A | * | 1/1998 | Bartholomew et al. |
| 6,122,255 A | * | 9/2000 | Bartholomew et al. ...... 370/352 |

OTHER PUBLICATIONS

Bellcore White Paper, Architectural Solutions to Internet Congestion based on SS7 and Intelligent Network Capablities, Publications No. 00A–1019W, Oct. 30, 1997 by Dr. Amir Atai and Dr. James Gordon.

* cited by examiner

Primary Examiner—Huy D. Vu
Assistant Examiner—Phuongchau Ba Nguyen
(74) Attorney, Agent, or Firm—Withrow & Terranova, P.L.L.C.

(57) ABSTRACT

Method and apparatus for alleviating switch congestion caused by long hold times for on-line access calls. A protocol converting device is connected to the originating switch in a public network, usually an ISDN switch. We call the protocol converting device a "smart connector". The smart connector is connected to the switch by a high speed LAN. The smart connector and the switch include computer program code and hardware which allow the smart connector to transparently re-direct on-line access calls away from the switch and the public network and to a service provider, usually an Internet service provider, through a dedicated data network connected to the provider's point-of-presence (POP). The smart connector provides protocol conversion functions.

10 Claims, 5 Drawing Sheets

| DSAP Address (8 bits) | SSAP Address (8 bits) | Control Field (1 or 2 octets) | Virtual Circuit Number (6 bits) | Channel Identifier (2 bits) | Payload (Information) |

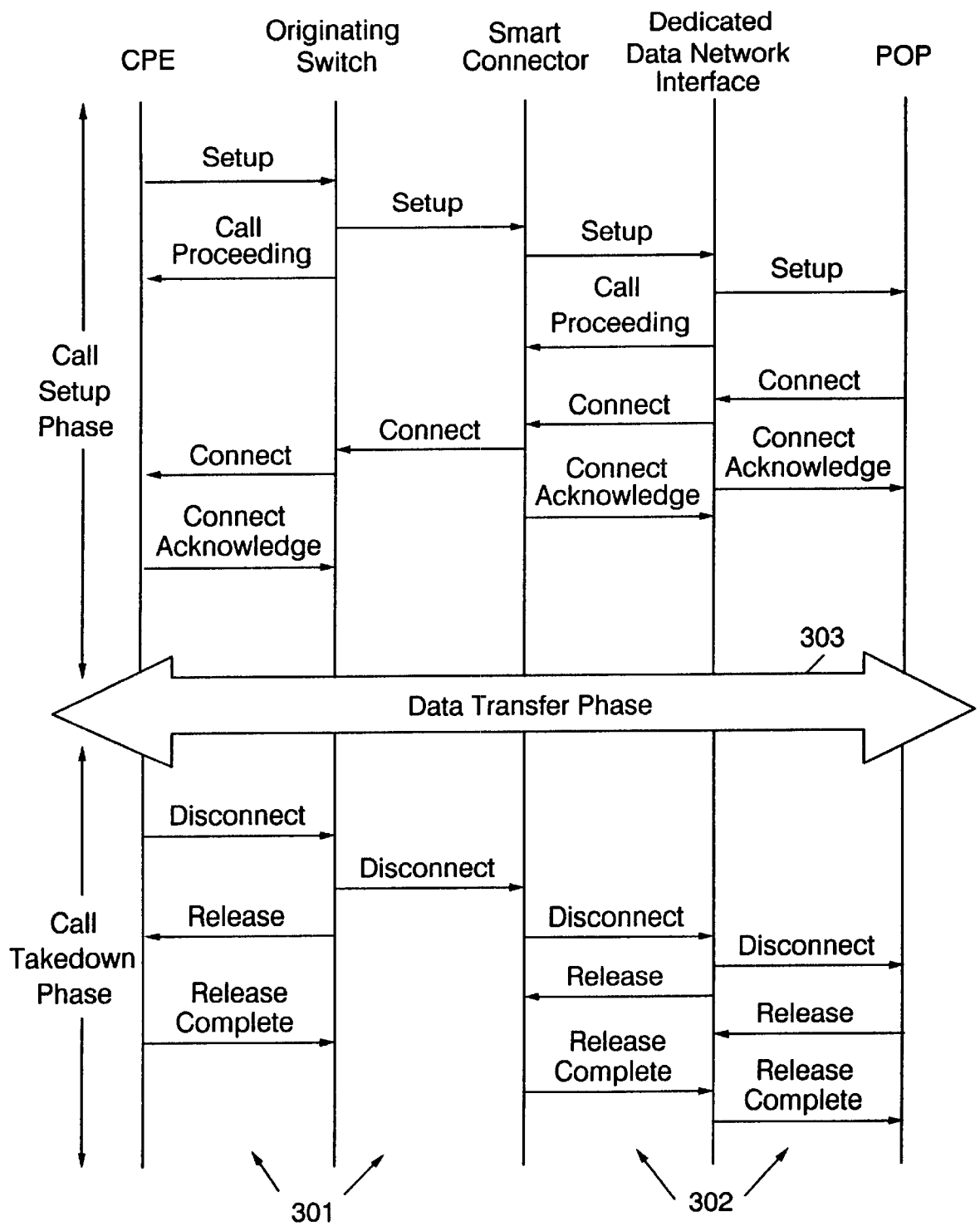

CONVERTING DEVICE FOR ALLEVIATING SWITCH CONGESTION CAUSED BY LONG HOLD TIMES FOR ON-LINE ACCESS CALLS

CROSS-REFERENCE TO RELATED APPLICATIONS

This application is related to application Ser. No. 08/980,534, filed on Dec. 1, 1997, entitled "Method and Apparatus for Identifying and Handling On-Line Access Calls Within a Switch", which issued as U.S. Pat. No. 6,081,589 on Jun. 27, 2000, and which is assigned to the assignee of the present application.

BACKGROUND

1. Field of the Invention

This invention relates to the use of a protocol converting device to alleviate switch congestion caused by long hold times for on-line access calls such as Internet access calls. The invention is useful to alleviate congestion in a public telecommunications network such as an integrated services digital network (ISDN).

2. Description of the Problem Solved

Currently, all calls made via the public general purpose communications network are routed through the public network fabric. In most areas this fabric is an integrated services digital network (ISDN) fabric. The public network today does not distinguish between on-line access calls and other calls. In the case of on-line access calls, the public network switching fabric is used to connect the user to the point of presence (POP) for the on-line provider, usually an Internet service provider (ISP).

The advent of on-line services and especially the Internet has caused switching congestion to occur in the public network fabric due to the long holding times associated with on-lines access calls. This congestion can prevent the completion of regular speech and data calls due to the non-availability of switching resources over prolonged periods.

What is needed is a way to divert on-line access calls away from the public network switching fabric at the originating switch. The call should be routed through a dedicated data network that is also connected to the POP for the service provider.

SUMMARY

The present invention meets the above-mentioned need by providing a protocol converting device which diverts calls away from the public network fabric onto a dedicated data network fabric. We call the protocol converting device a "smart connector". In the preferred embodiment the smart connector-is connected to the originating switch via a local area network (LAN), preferably a high speed, high performance LAN such as a fast Ethernet LAN. The smart connector is also connected to a dedicated data network over which the on-line access calls are routed. The smart connector provides protocol conversion functions.

The smart connector according to this invention includes a LAN adapter, an adapter for the dedicated data network, and processing for connecting and managing the on-line access call between a user and a service provider. In the preferred embodiment, the processing core includes storage devices, a processor, and appropriate computer program code. All of these components are interconnected by a bus. In some cases, a workstation or personal computer serves as the hardware platform for the smart connector. The appropriate computer program code is stored in a medium. This medium may be a diskette, hard disk, or some type of memory device such as a programmable read-only memory.

The smart connector exchanges messages with a user and with the dedicated data network to manage call set-up and take-down in a way that is transparent to the originating switch and the user. The user is usually in a small office or home office (SOHO) environment, and connects to the switch with customer premises equipment (CPE). A call is first identified as an on-line access call. Once the call is identified, the smart connector receives a setup request from the CPE through the originating switch, and in turn sends a setup request to the dedicated data network. The smart connector then receives a call proceeding message from the dedicated data network and a connect message from the dedicated data network. The smart connector then forwards a connect message to the CPE through the originating switch and sends a connect acknowledgment message to the dedicated data network. The smart connector then enters the data transfer phase where data is transferred to and from the originating switch over a virtual data channel and to and from the service provider over a switched virtual circuit. The smart connector provides protocol conversion functions.

When a call is taken down, a disconnect message is received from the CPE through the originating switch. A disconnect message is then forwarded to the dedicated data network. A release message is then received from the dedicated data network, and a release complete message is sent on to the dedicated data network. All messages sent to the dedicated data network are eventually forwarded in some form to the service provider.

The network environment in which the invention is employed includes the small office/home office (SOHO) environment with customer premises equipment (CPE). A public network switch is connected to the CPE. The smart connector is connected to the switch via a LAN. The smart connector is also connected to a dedicated data network, which in turn is connected to the point of presence (POP) for the service provider.

When the present invention is used, on-line access calls which are normally routed through the public network switching fabric to which the above-mentioned switch is also connected, are diverted through a dedicated data network. Thus, switch congestion on the general purpose public network which would normally be caused by the long hold times associated with on-line access calls is eliminated.

BRIEF DESCRIPTION OF THE DRAWINGS

FIG. 3 shows the message flow diagram when the smart connector of the present invention is employed.

DETAILED DESCRIPTION OF THE PREFERRED EMBODIMENTS

Figure 1:
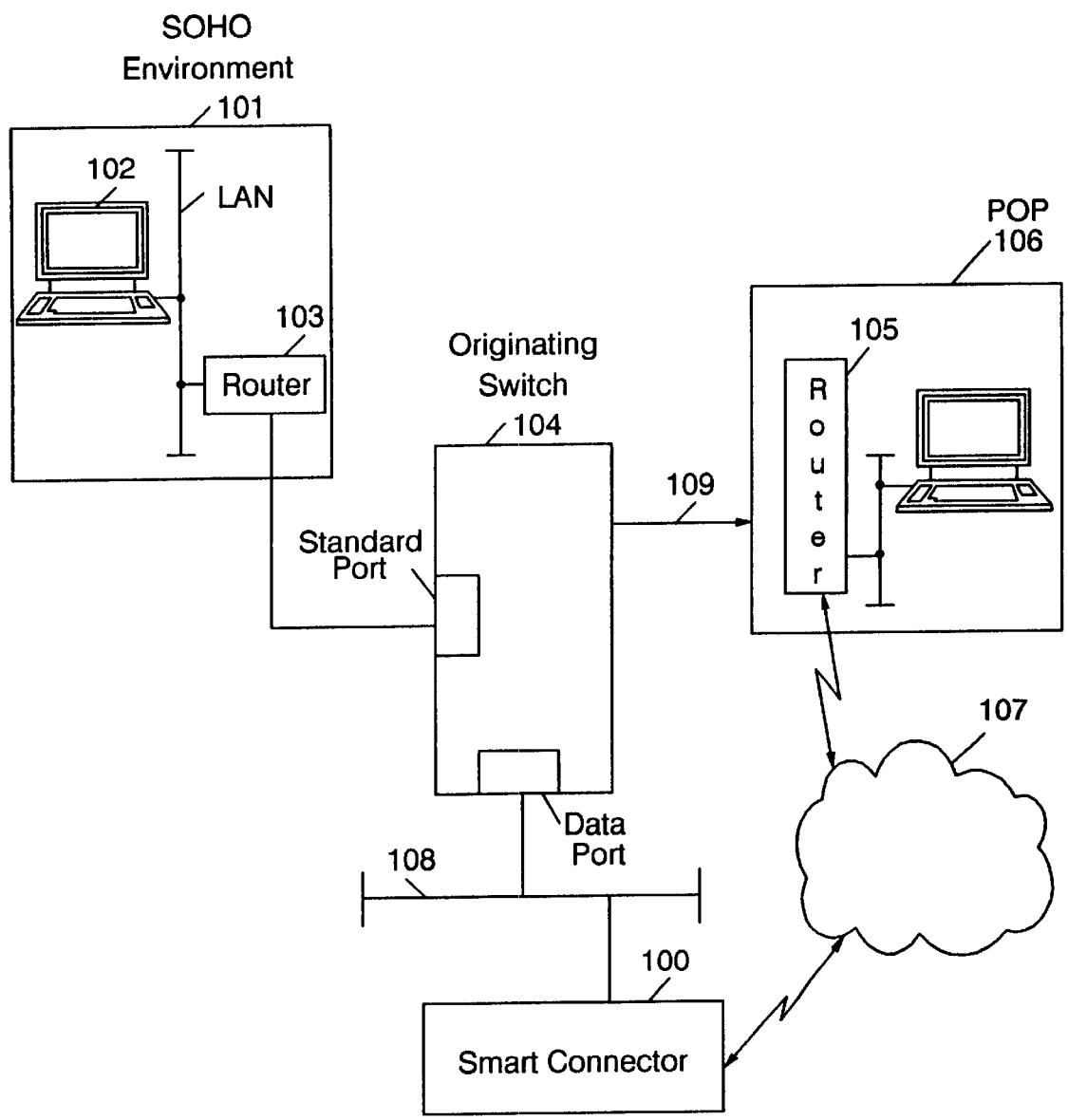
FIG. 1 shows a network environment in which the smart connector of the present invention is used.

FIG. 1 shows a typical network operating environment for the present invention. The SOHO environment 101 contains users who typically access network services via a workstation 102 which is connected to a router 103 via a local area network (LAN). Alternatively, the SOHO environment could consist of a user whose workstation is connected to the router through some type of local loop via converting devices such as a modems. In any case, the equipment in the SOHO environment is called the customer premises equipment (CPE). The originating switch 104 is typically a switch in a public network. In most cases today this network will be an integrated services digital network (ISDN). Although we refer to this network as a "public network" for convenience in the description, this network may be a privately owned wide area network or other type of switched network. Users of this switch 104 are connected to the switch via standard ports which are designed to handle all types of voice and data. In the ISDN case these are basic rate interface (BRI) ports. According to the present invention, however, there exists in the switch a data port connected to a LAN 108. The switch 104 has the capability to be programmed to route calls for specific addresses or phone numbers to specific ports. The LAN 108 preferably is a high performance LAN such as a fast Ethernet LAN. The LAN 108 is in turn connected to the "smart connector" 100 of the present invention.

At the end of this network operating environment is a point of presence (POP) 106 for an on-line access service provider. In most cases the service provider will be an Internet service provider (ISP) providing Internet access to users in the SOHO environment 101; however, the service provider could alternately be commercial on-line service such as Lexis or Dialog. The service provider POP includes a router 105 for connection to the various network paths back to the users.

Public network switching fabric 109 represents the conventional path from the originating switch 104 to the service provider POP 106. However, when the present invention is employed, switching congestion on the public network switching fabric 109 is alleviated by intercepting on-line access calls and transparently passing them to a high speed dedicated data network 107 using the resources of the smart connector 100. On-line access calls are intercepted through an on-line access call identification mechanism incorporated into the switch 104. In the preferred embodiment, the dedicated data network is a frame relay network. The switch 104 initially passes these calls onto the LAN 108 when it identifies them as on-line access calls. The destination address corresponds to the phone number or station number for on-line access through the service provider.

Figures 2, 7:
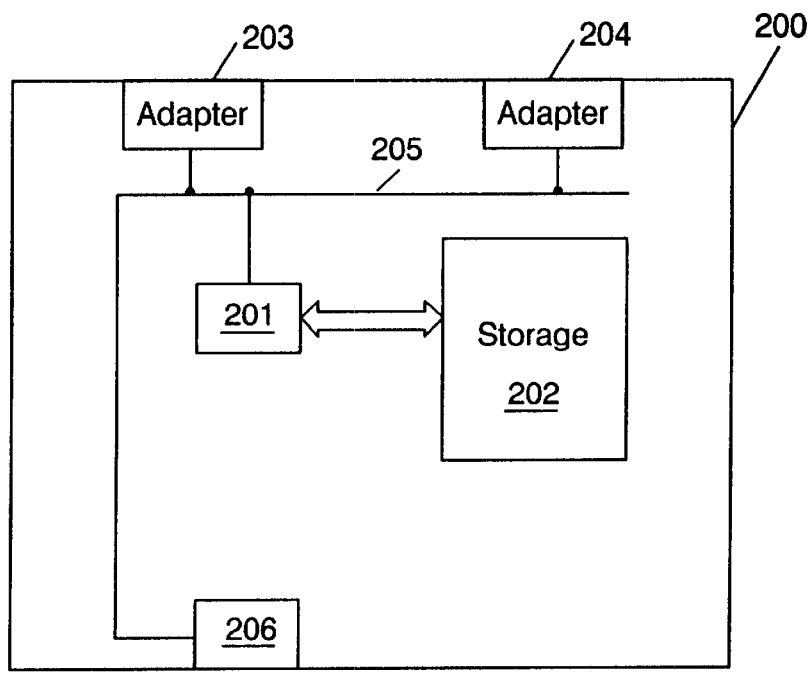
FIG. 2 shows a block diagram of the smart connector according to the present invention.
FIG. 7 shows the protocol data unit format used with the smart connector of the present invention.

FIG. 2 shows a functional block diagram of the smart connector 200 according to the present invention. The smart connector contains bus 205 to which network adapters 203 and 204 are connected. In this embodiment one of these is a LAN adapter and the other is a dedicated data network adapter for connection to the data network which is used to transport data to the service provider. Bus 205 is also connected to a media device or devices 206, which may be one-or a combination of diskette drives, a hard drive, or a CD-ROM. Memory storage 202 and a microprocessor 201 together control the operation of the smart connector and with appropriate software form the processing core for connecting and managing on-lines access calls between users and the service provider, diverting the calls from the public network and onto the dedicated data network to alleviate switch congestion in the public network. In practice, the smart connector hardware is most easily implemented by a PC or workstation with appropriate software installed. The smart connector could however be implemented as a dedicated hardware device such as a router.

FIG. 3 shows a message flow diagram which illustrates the message flow between various parts of the network while the smart connector is being used to redirect on-line access calls away from the public network and over the dedicated data network. Initially, the on-line access call is identified at the originating switch. Ways to identify such calls are described in the related application, which is incorporated herein by reference. These call identification methods include using an advanced intelligent network (AIN) trigger or using called party number look-up tables. During the call setup phase, after identifying the call, a setup message is sent from the CPE to the originating switch and then to the smart connector. The smart connector then sends a setup message to the dedicated data network interface and it is forwarded through the dedicated data network to the service provider POP. The originating switch and the dedicated data network interface then both send call proceeding messages, to the CPE and the smart connector, respectively. A connect message is sent from the POP through the dedicated-data network interface to the smart connector. The smart connector then sends a connect message to the originating switch for forwarding to the CPE. The CPE sends a connect acknowledgment to the switch and the smart connector sends a connect acknowledgment through the dedicated data network interface on to the service provider POP. The system now enters the data transfer phase 303 using a virtual data channel and switched virtual circuits, to be described in more detail later.

When the on-line access call is complete, the communication enters the call takedown phase, shown at the bottom of FIG. 3. A disconnect message is sent from the CPE to the smart connector via the originating switch. The smart connector then sends a disconnect to the service provider POP through the dedicated data network interface. The POP returns a release message to the smart connector and the switch sends a release message to the CPE. The CPE then sends a release complete message to the switch, and the smart connector sends a release complete message to the service provider POP.

In the preferred embodiment of the invention, the SOHO environment and the originating switch are in an integrated services digital network (ISDN). Therefore, the messages exchanged on the left side of the flow diagram 301 in FIG. 3 are formatted according to the well-known ITU-T Recommendation Q.931 for the ISDN signaling protocol. The interface from the CPE to the originating switch is an ISDN basic rate interface (BRI) having 2 B channels and a D channel (2B+D). Additionally, the dedicated data network in the preferred embodiment of the invention is a frame relay network; therefore, the messages exchanged on the right side of the flow diagram 302 in FIG. 3 are formatted according the ITU-T Recommendation Q.933 for the frame relay signaling protocol. The data link layer for connection between the smart connector and the frame relay network in the preferred embodiment is specified in ITU-T Recommendation Q.922. Also, since the service provider is usually providing Internet access to users in the preferred embodiment, data transfer packets exchanged between the user and the POP follow the popular Internet point-to-point protocol (PPP).

Figure 4:
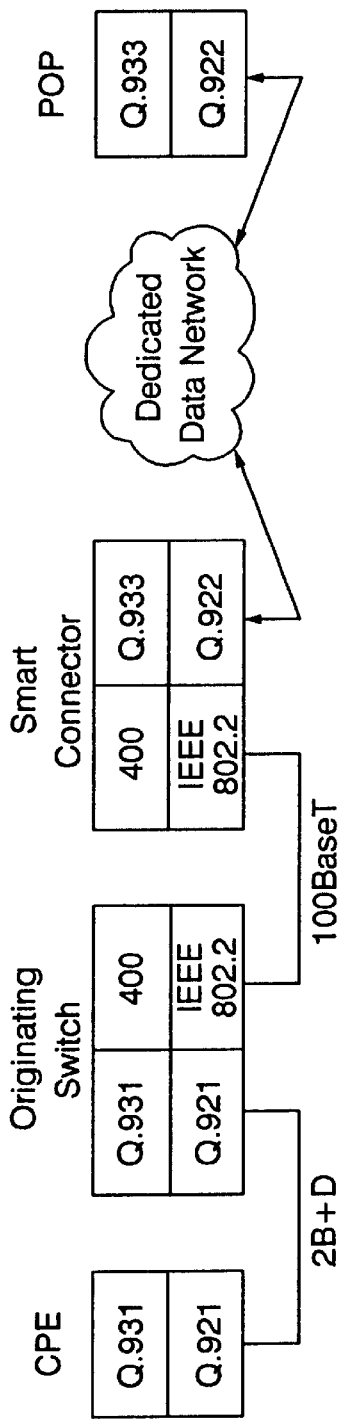
FIG. 4 shows the call control protocol stacks according to the present invention.

The connection between the smart connector and the originating switch according to the present invention requires a high performance LAN. Preferably, a fast Ethernet 100BaseT LAN as specified in the IEEE 802.2 Recommendation is used. FIG. 4 illustrates the entire call control protocol stack for the network environment in which the smart connector of the present invention is operating. Data link layer 400 uses a signaling and an addressing protocol which is designed to make the operation of the smart connector transparent to the switch and therefore also to the user.

The smart connector provides protocol conversion functions as follows. At start-up time, before calls are established as shown in FIG. 3, the switch establishes a data link connection with the smart connector using the signaling and addressing protocol of layer 400 in FIG. 4. All signaling messages include at least message type field which identifies the message type and a call reference field which uniquely identifies a call on an ISDN BRI. An establishment request from the switch to the smart connector additionally includes a called address field. Optionally, the establishment request can include a bearer capability field and a calling address. A takedown request includes a cause field in addition to the message type and call reference fields. The connection acknowledgment message contains only the call reference field and message type field. Reset request, reset reject and reset acknowledgment messages all contain a reset scope field to specify either an interface or the entire port, and a port address in addition to the message type and call reference fields. If the reset scope field specifies the interface, the reset request message also contains an interface address field. A status inquiry message contains the port address in addition to the message type and call reference fields. Finally, a status indication message consists of the message type field, call reference field, port address field, deflected call count field, deflected call details field and an error measurements field.

Figure 5:
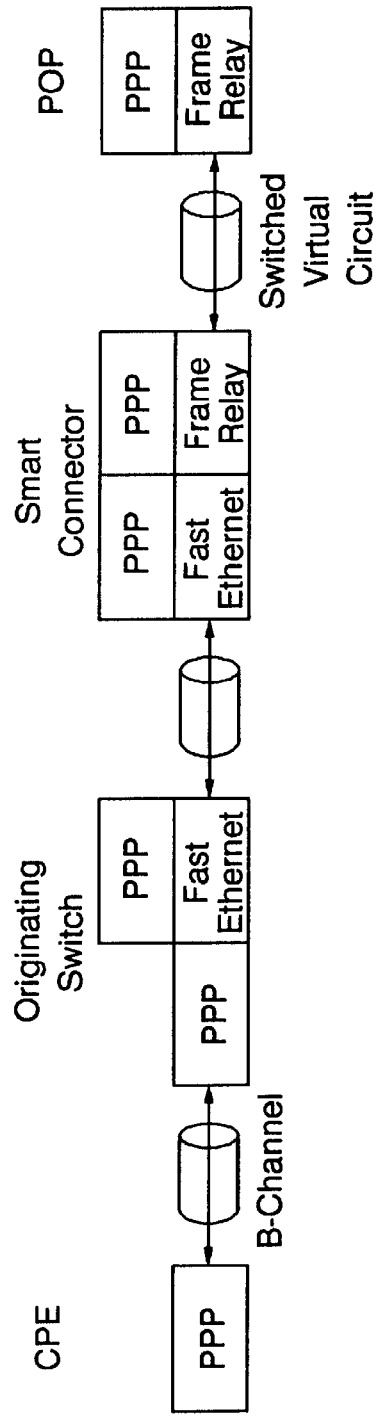
FIG. 5 shows the data transfer protocol stacks according to the present invention.
Figure 6:
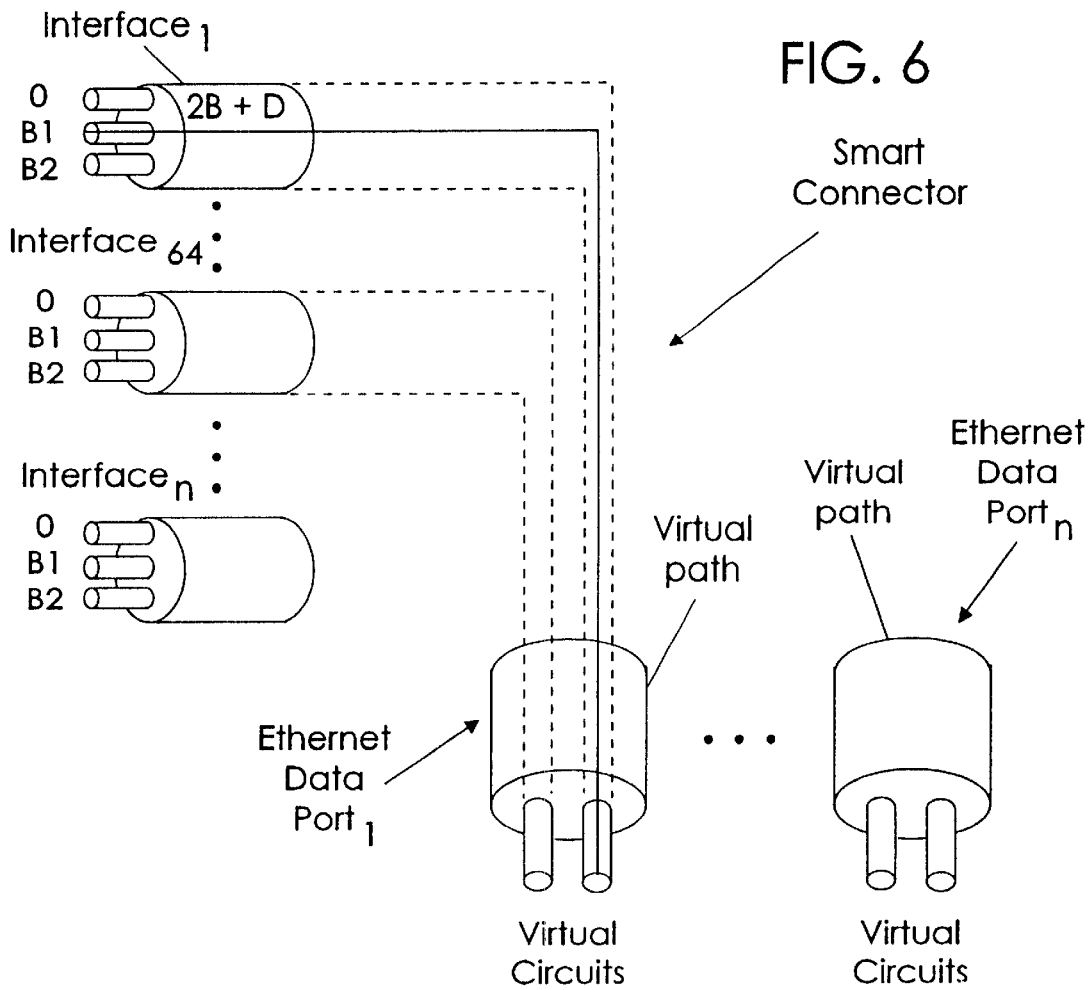
FIG. 6 shows the connection of the virtual path and virtual circuits used by the smart connector of the present invention.

Once the data link connection is established between the switch and the smart connector, a virtual path is formed as shown in FIG. 6. It is this virtual path through which calls are established and directed between the originating switch and the smart connector as shown in FIG. 3. Each endpoint of a virtual path is called a service access point (SAP). The virtual path includes up to 64 virtual circuits. Each virtual circuit houses one virtual signal channel and two virtual data channels. Within the originating switch, a virtual circuit is a logical representation of an ISDN basic rate interface whose on-line access calls are being deflected via the data port on the switch. The D channel of an ISDN interface maps into the virtual signaling channel of the virtual circuit and the B1 and B2 channels of the ISDN interface map into virtual data channels. The smart connector transfers data between a virtual data channel of a virtual path established with the switch and a switched virtual circuit established according frame relay protocols within the frame relay network. FIG. 5 illustrates the entire protocol stack for the data transfer phase of FIG. 3 in the network environment of the preferred embodiment of the invention.

FIG. 7 illustrates a logical link control (LLC) protocol data unit (PDU) for communication between the smart connector and the originating switch in the embodiment of the invention where the smart connector is used. The DSAP address identifies the service access point for which the payload is intended. The SSAP address identifies the specific service access point from which the payload was initiated. The control field is used to designate command and response functions. All of these fields use the format described for such fields in IEEE Recommendation 802.2. The virtual circuit number field contains six bits and identifies a physical interface within a virtual path. Valid values for this field are decimal 0 to 63. The channel identifier field contains two bits and identifies the signaling and data channels within a virtual circuit. Binary 01 represents a virtual signaling channel. 10 represents virtual data channel 1 and 11 represents virtual data channel 2. 00 is unused. The payload is the information field. This field contains the Q.931 messages exchanged during call setup and takedown as well as PPP packets during the data transfer phase.

Figure 8:
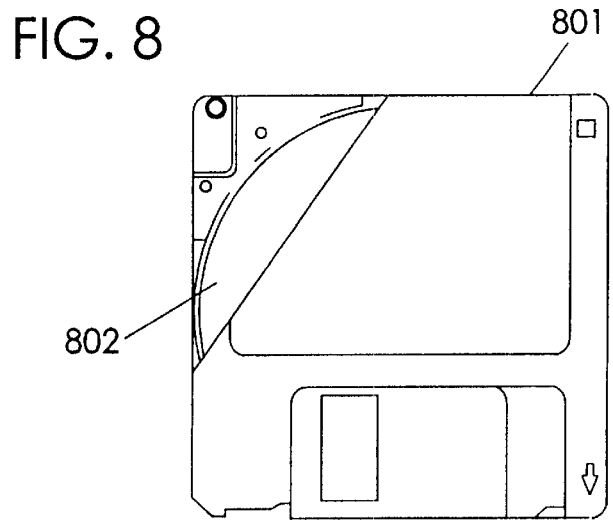
FIG. 8 shows an example program code storage media which may be used with the present invention.

As previously stated, appropriate computer program code in combination with hardware implements some elements of the present invention. This computer program code is usually at some point stored in a storage media. This media can be a diskette, hard disk or CD-ROM. The media can also be a memory storage device or collection of memory storage devices or circuits such as read-only memory (ROM) or random-access memory (RAM). The media can be. a hard disk in a server or client computer system, in which case a user or customer can obtain a copy of the code by downloading or network transfer. FIG. 8 illustrates one example of a media. FIG. 8 shows a diskette of the type where a magnetic media 802 is enclosed in a protective jacket 801. Magnetic field changes in over the surface of the magnetic media 802 are used to encode the computer program code. In this way the computer program code is stored for later retrieval.

We have described a specific embodiment of our invention of a protocol converting device for alleviating switch congestion in a public network. The specific embodiment uses an ISDN public network and a frame relay network. One of ordinary skill in the networking art will quickly recognize that the invention has other applications in other environments. In fact, many embodiments and implementations are possible.

We claim:

1. In a converting device providing protocol conversion for routing on-line access calls from a switch in a public network to a dedicated data network, a method of managing an on-line access call as identified by the switch from a user to a service provider from a user to a service provider, the method comprising the steps of:

receiving a first setup request from the switch via a local area network, which connects the switch and the converting device;

sending a second setup request to the dedicated data network for forwarding to the service provider;

receiving a call proceeding message from the dedicated data network;

receiving a first connect message from the dedicated data network;

sending a second connect message to the switch via the local area network;

sending a connect acknowledgment message to the dedicated data network for forwarding to the service provider; and entering a data transfer phase wherein data is transferred to and from the switch via a virtual data channel and to and from the service provider via a switched virtual circuit.

2. The method of claim 1 further comprising the steps of:

receiving a first disconnect message from the switch;

sending a second disconnect message to the dedicated data network for forwarding to the service provider;

receiving a release message from the dedicated data network; and sending a release complete message to the dedicated data network for forwarding to the service provider.

3. The method of claim 1 wherein the switch is an integrated services digital network (ISDN) switch.

4. The method of claim 2 wherein the switch is an integrated services digital network (ISDN) switch.

5. The method according to any of claims 1–4 wherein the dedicated data network is a frame relay network.

6. A computer program product for use with a converting device providing protocol conversion for routing on-line access calls from a switch in a public network to a dedicated data network, the computer program product having a medium with computer program code embodied therein to manage an on-line access call as identified by the switch from a user to a service provider, the computer program code comprising:

computer program code for receiving a first setup request for the on-line access call from the via a local area network, which connects the switch and converting device switch;

computer program code for sending a second setup request to the dedicated data network for forwarding to the service provider;

computer program code for receiving a call proceeding message from the dedicated data network;

computer program code for receiving a first connect message from the dedicated data network;

computer program code for sending a second connect message to the switch via the local area network computer program code for sending a connect acknowledgment message to the dedicated data network for forwarding to the service provider; and computer program code for entering a data transfer phase wherein data is transferred to and from the switch via a virtual data channel and to and from the service provider via a switched virtual circuit.

7. The computer program product of claim 6 wherein the computer program code further comprises:

computer program code for receiving a first disconnect message from the switch;

computer program code for sending a second disconnect message to the dedicated data network for forwarding to the service provider;

computer program code for receiving a release message from the dedicated data network; and computer program code for sending a release complete message to the dedicated data network for forwarding to the service provider.

8. The computer program product of claim 6 wherein the public network is an integrated services digital network (ISDN).

9. The computer program product of claim 7 wherein the public network is an integrated services digital network (ISDN).

10. The computer program product according to any of claims 6 through 9 wherein the dedicated data network is a frame relay network.

\* \* \* \* \*